United States Patent
Thorsted

(10) Patent No.: US 7,732,782 B2
(45) Date of Patent: Jun. 8, 2010

(54) CORONA DETECTION DEVICE

(75) Inventor: Michael K. Thorsted, King George, VA (US)

(73) Assignee: Syntronics L.L.C., King George, VA (US)

( * ) Notice: Subject to any disclaimer, the term of this patent is extended or adjusted under 35 U.S.C. 154(b) by 551 days.

(21) Appl. No.: 11/723,543

(22) Filed: Mar. 20, 2007

(65) Prior Publication Data

US 2008/0233504 A1    Sep. 25, 2008

(51) Int. Cl.
*G01J 1/42* (2006.01)
(52) U.S. Cl. ............................................. 250/372
(58) Field of Classification Search ............... 250/372, 250/214 VT, 226; 356/300
See application file for complete search history.

(56) References Cited

U.S. PATENT DOCUMENTS

| 5,886,344 | A |   | 3/1999  | Forsyth |
| 6,150,652 | A |   | 11/2000 | Forsyth |
| 6,323,491 | B1 | * | 11/2001 | Forsyth ...................... 250/372 |
| 7,022,993 | B1 | * | 4/2006  | Williams et al. ............ 250/343 |
| 7,385,681 | B2 | * | 6/2008  | Ninomiya et al. .......... 356/5.01 |

* cited by examiner

*Primary Examiner*—Mark Hellner
(74) *Attorney, Agent, or Firm*—Finnegan, Henderson, Farabow, Garrett & Dunner LLP

(57) ABSTRACT

A corona detection device includes a bandpass filter having a primary passband that includes at least wavelengths in the range of about 250 nm to about 400 nm and a secondary passband that includes wavelengths in the range of about 675 nm to about 850 nm. The corona detection device also includes an image intensifier in optical communication with the bandpass filter. The image intensifier is configured to generate an image based on radiation passed through the primary passband and the secondary passband of the bandpass filter.

19 Claims, 4 Drawing Sheets

CORONA DETECTION DEVICE

TECHNICAL FIELD

The disclosed methods and systems relate generally to corona detection and, more particularly, to corona detection devices having a bandpass filter with a passband in the ultraviolet (UV) spectrum and a passband in the visible spectrum.

BACKGROUND

The need for corona detection is widespread and extends not only to power utility companies, but also to any entity interested in maintaining power circuitry and electronic devices. Corona discharge is a luminous partial discharge from conductors and insulators caused when an electric field surrounding the conductors and insulators exceeds a critical value and causes the surrounding air to begin to behave more as a conductor rather than an insulator. A high local electric field ionizes the air, causes excitation of nitrogen molecules in the air, and leads to discharge of ultraviolet radiation.

Corona discharge can be problematic for several reasons. For example, corona discharge generates ozone and nitrogen oxides, which can form corrosive compounds such as nitric acid, especially in the presence of high humidity. These corrosive compounds can significantly reduce the service life and performance of electrical components. Additionally, corona discharge can cause damage to high voltage insulators and can create radio interference and audio noise.

Electric fields large enough to cause ionization of the air are commonly caused where there is a problem or defect associated with power supply circuitry or other electrical components. These problems and defects may correspond to points of potential equipment failure. Thus, devices configured to detect the presence of corona discharge can be used to locate and correct such problems and defects before failure occurs.

Corona discharge emits radiation within a spectral range of about 280 nm to about 400 nm. This spectral region falls mostly in the UV range and, therefore, is invisible to the human eye. Light emitted by corona discharge in air is heavily concentrated in a relatively small number of very narrow bands, typically a few nanometers (nm) or less, with weak emission intensity between the peaks of these bands. More than half of the total intensity emitted by a corona discharge is emitted at wavelengths shorter than 380 nm, and the strongest emission occurs at a narrow band centered about 337.1 nm. Additionally, reasonably strong emission occurs at shorter wavelengths, down to about 295 nm.

Various prior art devices have been developed and proposed for detecting and/or imaging areas of corona discharge. Generally, these devices included one or more UV filters for isolating UV radiation spectral bands that include corona discharge. In this manner, an image of the corona discharge could be generated based on the filtered UV radiation.

These prior art devices, however, were problematic. For example, the filters of these devices passed little or no radiation outside of the UV spectral bands specific to corona discharge. Therefore, these devices either completely lacked the ability to generate images based on radiation in the visible spectrum or produced visible images of poor quality. As a result, while these devices may have been able to image areas of corona discharge, they were less useful in providing a reference image (e.g., a visible radiation-based image) to enable a user to determine where on an object an imaged corona discharge originated.

Further, other prior art devices employed complex schemes of multiple filters to generate images of corona discharge. Each of the filters included a narrow passband intended to capture radiation emitted only at a particular spectral line of the corona discharge emission spectrum. Such multiple filter schemes can add to the expense and complexity of the corona detector design and degrade performance by introducing a plurality of attenuation sources in the optical path of the detector.

Still other devices included a single filter restricted to a narrow passband centered about a particular corona discharge spectral line. These devices had little flexibility. While they may have been able to generate an image of corona discharge, they were often restricted to certain operating conditions. Because of interference caused, for example, by the presence of solar radiation, a corona detector sensitive to only a particular spectral band may be useful only for night time or indoor use. Installation of a different filter targeting a different spectral line may be required for using the same corona detector outdoors or during daylight hours. Therefore, not only did these devices lack flexibility, but they also were unable to produce suitable reference images based on visible radiation.

Other prior art devices attempted to solve the problem of providing a user with a suitable reference image based on visible radiation by generating a visible image and merging this image with a UV image of the corona discharge. This approach typically required mirrors, multiple filters, and/or multiple optical paths. Further, this approach required multiple imaging devices and complicated optics or processing circuitry to overlay or merge the visible and UV images.

The disclosed corona detection device is directed toward overcoming one or more of the problems described above.

SUMMARY OF THE INVENTION

One aspect of the disclosure includes a corona detection device. The corona detection device includes a bandpass filter having a primary passband that includes at least wavelengths in the range of about 250 nm to about 400 nm and a secondary passband that includes wavelengths in the range of about 675 nm to about 850 nm. The corona detection device also includes an image intensifier in optical communication with the bandpass filter. The image intensifier is configured to generate an image based on radiation passed through the primary passband and the secondary passband of the bandpass filter.

Another aspect of the disclosure includes a corona detection device that includes a body and a hand grip attached to the body. An optical assembly is mechanically coupled to the body, and the optical assembly includes a bandpass filter having a primary passband that includes at least wavelengths in the range of about 250 nm to about 400 nm and a secondary passband that includes wavelengths in the range of about 675 nm to about 850 nm. The optical assembly also includes an image intensifier in optical communication with the bandpass filter and configured to generate an image based on radiation passed through the primary passband and the secondary passband of the bandpass filter. Additionally, a lens may be disposed along an optical path including the bandpass filter and the image intensifier.

Another aspect of the disclosure includes a method of detecting corona emitted from an object. The method includes collecting radiation emitted or reflected by the object and passing the radiation through a bandpass filter having a primary passband that includes at least wavelengths in the range of about 250 nm to about 400 nm and a secondary passband that includes wavelengths in the range of about 675 nm to about 850 nm to provide filtered radiation. The method also includes providing the filtered radiation to an image intensifier in optical communication with the bandpass filter and generating an image at the image intensifier based on the filtered radiation. Further, the method includes inspecting the image generated by the image intensifier.

DETAILED DESCRIPTION

Figure 1:
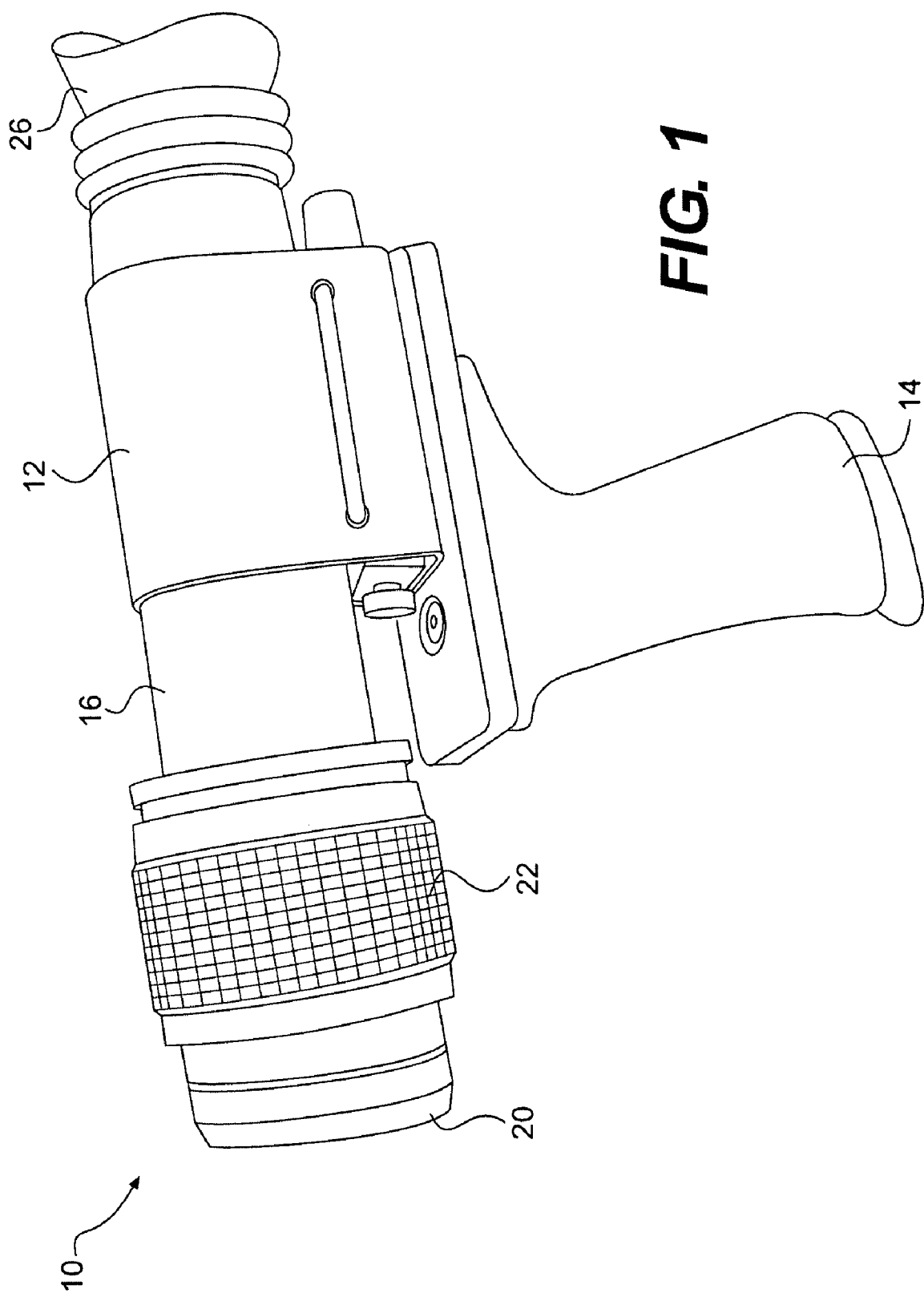
FIG. 1 provides a diagrammatic representation of a corona detection device according to an exemplary disclosed embodiment.

FIG. 1 provides a diagrammatic representation of a corona detection device 10 according to an exemplary disclosed embodiment. In one embodiment, corona detection device 10 may include a body 12 and a hand grip 14 attached to body 12. Hand grip 14 may be attached to body by any suitable method. For example, hand grip 14 may be attached to body 12 through a welded joint or a glued joint. Additionally, hand grip 14 may be attached to body 12 using various types of fasteners.

Hand grip 14 may enable a user of corona detection unit 10 to comfortably support and aim corona detection unit 10 at an area or object to be inspected for the presence of corona discharge. In addition to or as an alternative to hand grip 14, corona detection unit 10 may include a tripod mount, a vehicular mount, or any other suitable attachment arrangement for supporting corona detection unit 10 during use.

Corona detection unit 10 may also include an optical assembly 16 attached to body 12. Optical assembly 16 may include various components associated with collecting radiation associated with an inspected area and generating an image of the inspected area, including an image of corona discharge present in the inspected area.

Figure 2:
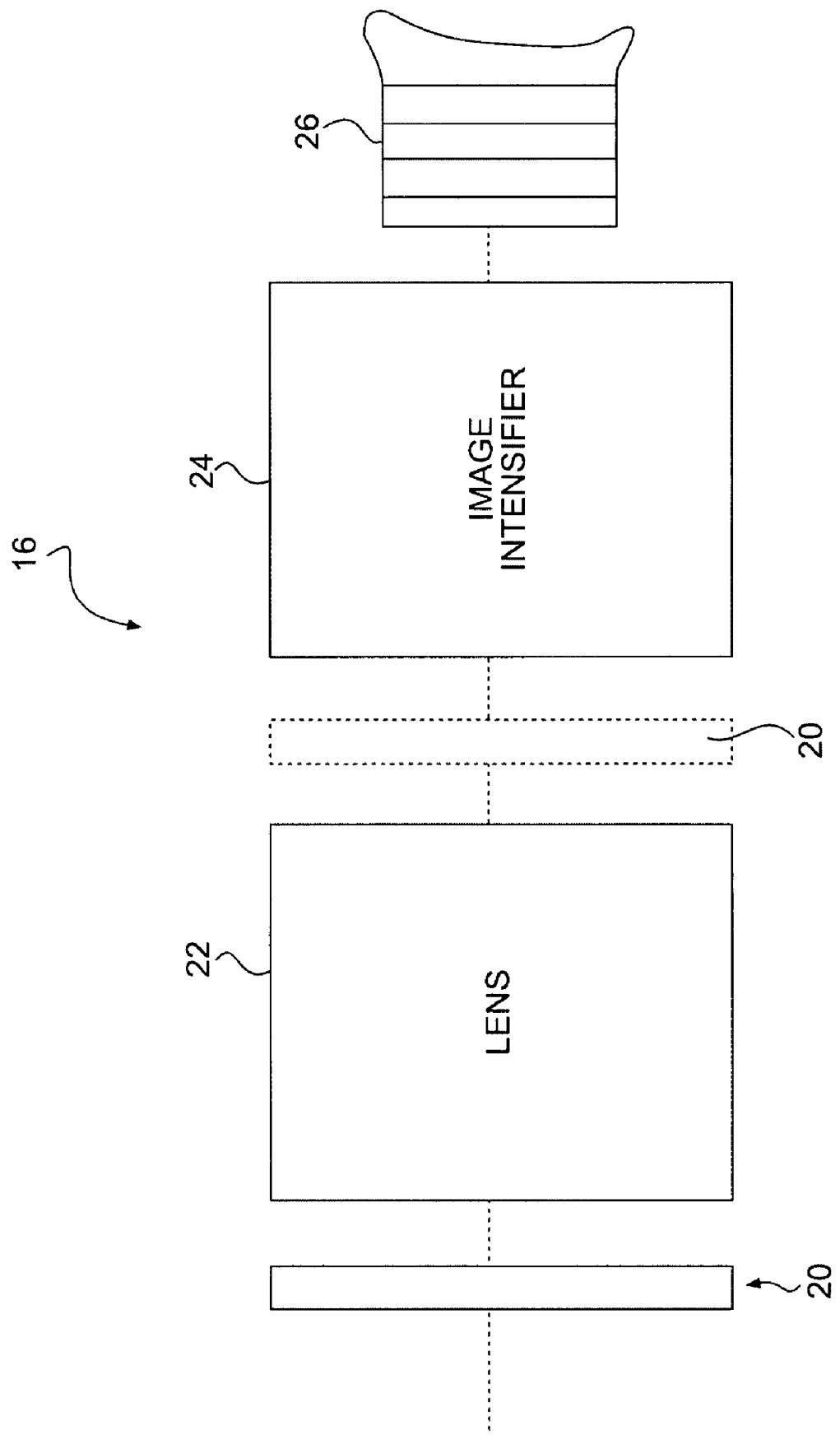
FIG. 2 provides a block diagram representation of an optical assembly for a corona detection device of an exemplary disclosed embodiment.

As represented by FIG. 2, optical assembly 16 may include a filter 20, a lens 22, an image intensifier 24, and an eyepiece 26. As illustrated in FIG. 2, each of the elements of optical assembly 16 may be disposed along a common optical axis. Alternatively, one or more elements of optical assembly 16 may be displaced from an optical axis defined by other components of optical assembly 16. In such embodiments, one or more mirrors or other optical elements may be included in optical assembly 16 to establish an optical path between the elements of optical assembly 16.

Figure 3:
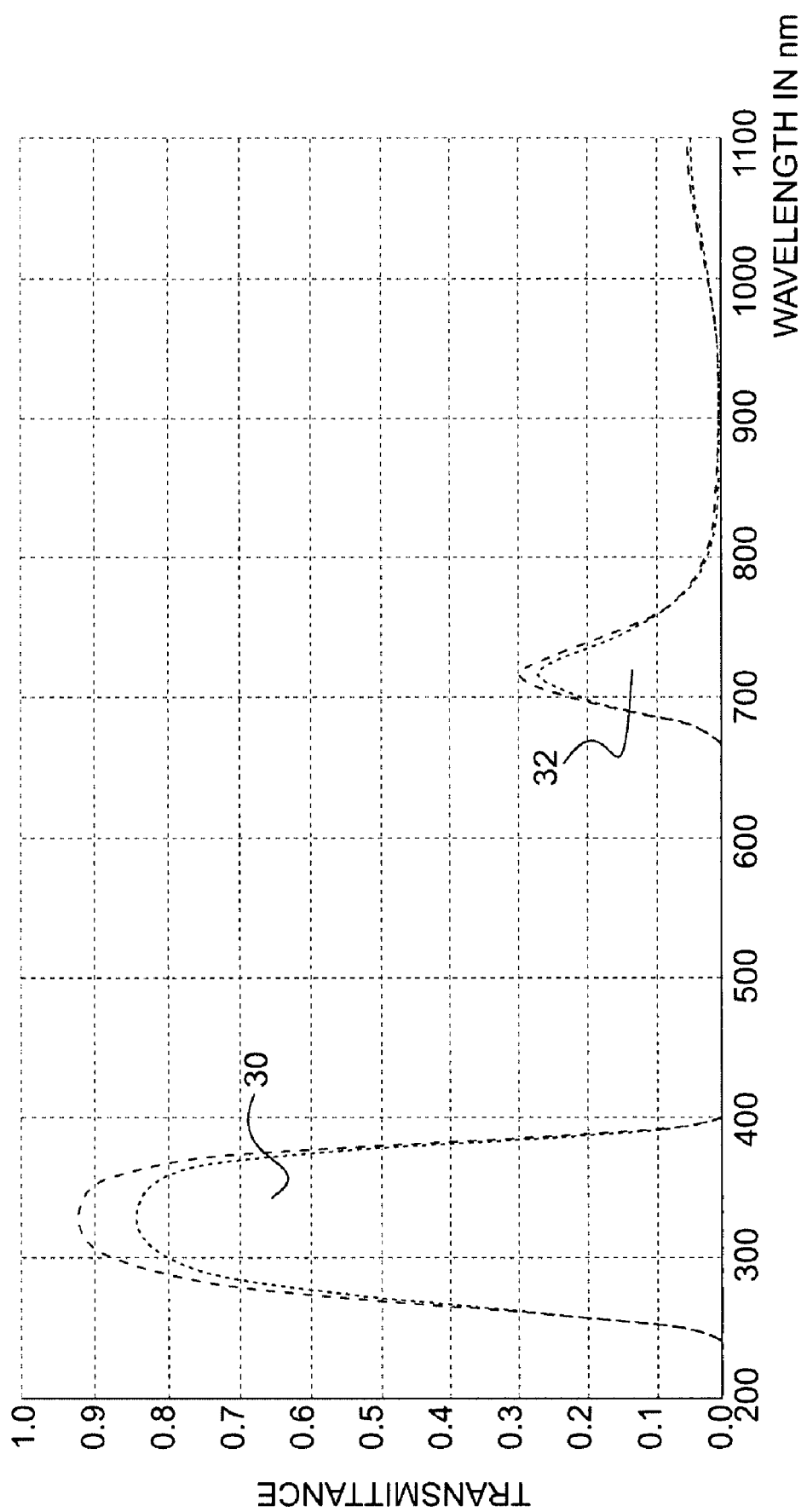
FIG. 3 provides an exemplary transmission spectrum for a filter incorporated in a corona detection device of an exemplary disclosed embodiment.

In one embodiment, filter 20 constitutes a bandpass filter that transmits radiation having wavelengths that fall within certain predetermined passbands and significantly attenuates radiation having wavelengths that fall outside of these passbands. For example, FIG. 3 represents a transmission spectrum for filter 20 according to one embodiment. As illustrated, filter 20 may include a primary passband 30 and a secondary passband 32. Radiation having wavelengths within primary passband 30 or within secondary passband 32 may pass through filter 20, while radiation with wavelengths outside of primary passband 30 and secondary passband 32 may be attenuated. In some embodiments, the amount of attenuation outside the primary and secondary passbands may be at least 20 dB. In other embodiments, the amount of attenuation outside the primary and secondary passbands may be at least 30 dB.

The location and width of primary passband 30 and secondary passband 32 may be selected according to the requirements of a particular application. For example, to operate in conjunction with corona detection device 10, filter 20 may be configured such that primary passband 30 includes at least a portion of the UV spectrum (e.g., about 10 nm up to about 400 nm) and at least one wavelength of radiation emitted by corona discharge in the UV spectrum. Further, for operation with corona detection device 10, filter 20 may be configured such that secondary passband 32 encompasses at least a portion of the visible spectrum (e.g., about 400 nm to about 800 nm). Particularly, primary passband 30 of filter 20 may include wavelengths in a range of about 250 nm to about 400 nm, and secondary passband 32 of filter 20 may include wavelengths in a range of about 675 nm to about 850 nm.

The transmittance of filter 20 in primary passband 30 and secondary passband 32 may also vary according to application. In corona detection device 10, filter 20 may have a peak transmittance of at least about 0.75 within primary passband 30. Additionally, filter 20 may have a peak transmittance of at least about 0.25 within secondary passband 32. In one embodiment, filter 20 may be fabricated from Schott UG 11 glass available from Bes Optics, Inc.

Returning to FIG. 2, filter 20 may be positioned at various locations within optical assembly 16. Particularly, filter 20 may be positioned at any point along the optical path of optical assembly 16 that is upstream from image intensifier 24. As illustrated in FIG. 2, filter 20 may be located at a position upstream from lens 22. Alternatively, filter 20 may be located at a position downstream from lens 22, as represented by the dashed lines.

Image intensifier 24 of corona detection device 10 may include any type of device capable of generating an image based on the radiation transmitted by filter 20. In one embodiment, image intensifier 24 may be configured with a sensitivity to radiation having wavelengths in both primary passband 30 and secondary passband 32. For example, in one embodiment image intensifier 24 may be responsive to radiation having wavelengths of from about 180 nm to about 800 nm. Thus, image intensifier 24 may be sensitive to wavelengths in at least a portion of both the UV and visible spectra.

The intensity of the radiation emitted by corona discharges is relatively low. Therefore, image intensifier 24 may be employed to intensify the radiation passing through filter 20. Additionally, because UV radiation is invisible to the human eye, image intensifier 24 may also convert the portion of radiation incident upon image intensifier 24 that falls within the UV spectrum to visible wavelengths. For example, image intensifier 24 may include a phosphor screen for projecting a visible image of not only the portion of incident radiation from the UV spectrum, but also the portion of incident radiation that falls within the visible spectrum. As a result, the image formed by image intensifier 24 may include both an image of the UV radiation emitted by a corona discharge and an image of visible radiation available from the object or area being inspected for corona discharge.

Any image intensifier device having a desired sensitivity range and imaging characteristics may be selected for use as image intensifier 24. In one embodiment, image intensifier 24 may include a photocathode of S-20 type UV-sensitive photocathode material.

Eyepiece 26 of optical assembly 16 may be configured, for example, for viewing the image output screen (e.g., the phosphor screen) of image intensifier 24. Eyepiece 26 may include any type of device suitable for viewing an image. Examples may include ocular lens devices similar to those included on microscopes or telescopes.

Lens 22 of optical assembly 16 may include any type of lens or lens system including multiple optical elements for transferring radiation (or filtered radiation from filter 20) from an object or area being inspected for corona discharge to image intensifier 24. As much of the radiation emitted from corona discharge falls within the UV range, lens 22 should be transmissive to UV radiation. Thus, lens 22 may include UV transmissive components made from quartz or another UV transmissive material. Lens 22 may also include a focusing mechanism for varying the focal length of lens 22 and changing the focus of the image provided to image intensifier 24. Lens 22 may also be configured to include various other adjustment capabilities, including aperture size adjustment.

Figure 4:
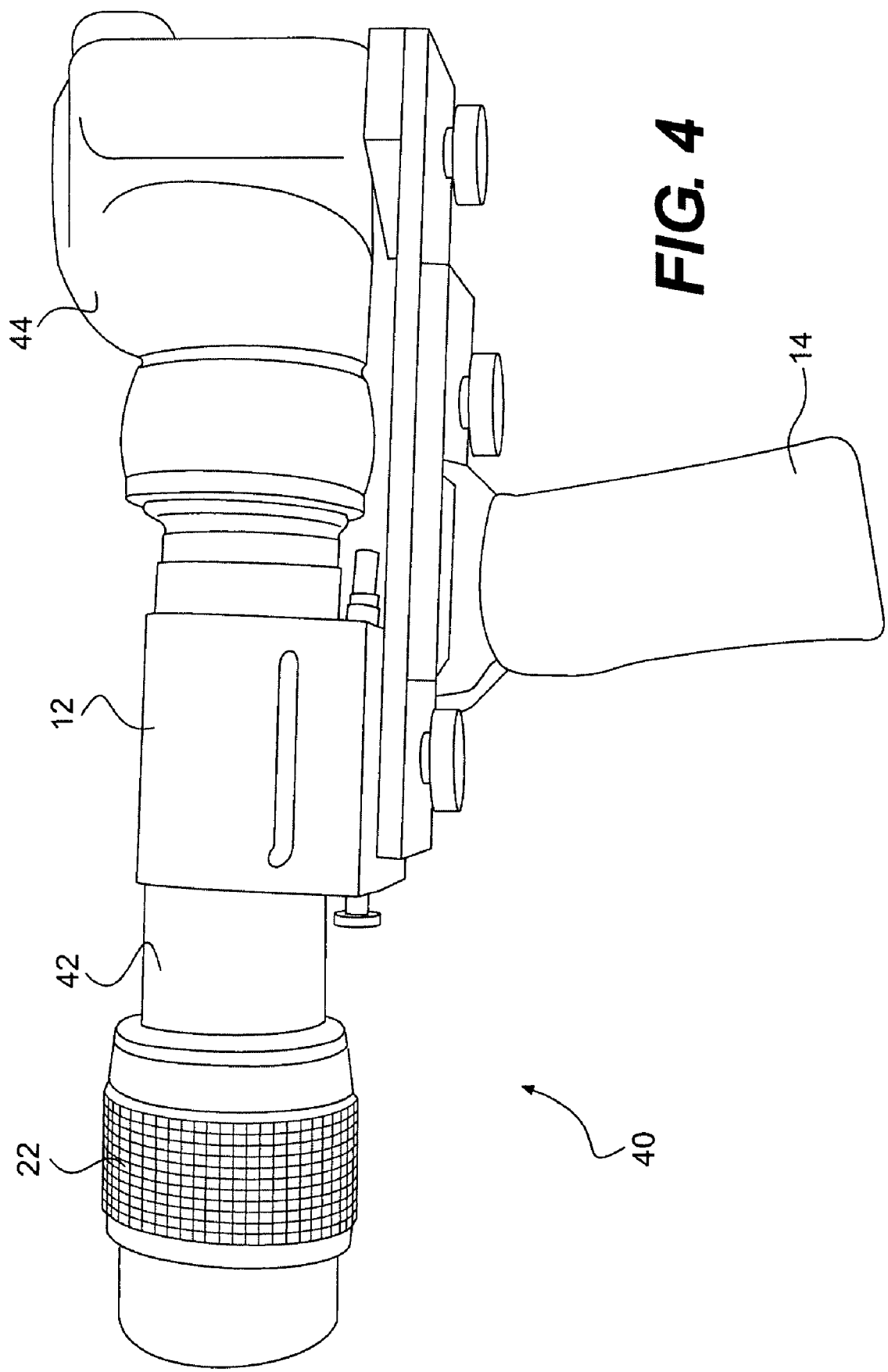
FIG. 4 provides a diagrammatic representation of a corona detection device according to another exemplary disclosed embodiment.

Various modifications may be made to corona detection device 10 without departing from the scope of the invention. For example, FIG. 4 provides a diagrammatic representation of another corona detection device 40 arranged similarly to corona detection device 10, as shown in FIG. 1. Rather than including an eyepiece 26 as part of optical assembly 16, however, corona detection unit 40 includes an optical assembly 42 fitted with a camera 44. In this embodiment, camera 44 may be mounted such that the lens of camera 44 focuses on the image projected on the phosphor screen of image intensifier 24. Thus, rather than viewing the generated image through an eyepiece 26, it may be possible to view the generated image on an LCD device associated with camera 44 or through an eyepiece associated with camera 44. Further, camera 44 may enable recording (digitally or via film) the images projected on the screen of image intensifier 24.

The disclosed corona detection devices may be used in any application in which there is a need to determine the presence and location of corona discharge. The single filter design of the presently disclosed embodiments offers several potential advantages. This design is less complex and costly, as compared to more complicated multi-filter designs. Further, the ability of the single filter to pass both UV and visible radiation enables generation of an image having both UV and visible-based components without using complicated image merging techniques and/or multiple optical paths.

It will be apparent to those skilled in the art that various modifications and variations can be made in the disclosed corona detection system without departing from the scope of the disclosure. Other embodiments of the disclosed systems and methods for corona detection will be apparent to those skilled in the art from consideration of the specification and practice of the disclosure disclosed herein.

What is claimed is:

1. A corona detection device, comprising:
   a bandpass filter having a primary passband that includes wavelengths in a range of about 250 nm to about 400 nm and a secondary passband that includes wavelengths in a range of about 675 nm to about 850 nm; and
   an image intensifier in optical communication with the bandpass filter and configured to generate an image based on radiation passed through the primary passband and the secondary passband of the bandpass filter.

2. The corona detection device of claim 1, wherein the image intensifier is responsive to radiation having wavelengths of about 180 nm to about 800 nm.

3. The corona detection device of claim 1, wherein the image generated by the image intensifier is projected on a phosphor screen associated with the image intensifier.

4. The corona detection device of claim 3, further including an eyepiece configured for viewing the phosphor screen of the image intensifier.

5. The corona detection device of claim 3, further including a camera configured for recording images projected on the phosphor screen.

6. The corona detection device of claim 1, wherein the primary passband includes a peak transmittance of at least about 0.75.

7. The corona detection device of claim 1, wherein the secondary passband includes a peak transmittance of at least about 0.25.

8. The corona detection device of claim 1, further including a variable focus quartz lens in optical communication with the image intensifier.

9. A corona detection device, comprising:
   a body;
   a hand grip attached to the body; and
   an optical assembly mechanically coupled to the body, wherein the optical assembly includes:
      a bandpass filter having a primary passband that includes wavelengths in a range of about 250 nm to about 400 nm and a secondary passband that includes wavelengths in a range of about 675 nm to about 850 nm;
      an image intensifier in optical communication with the bandpass filter and configured to generate an image based on radiation passed through the primary passband and the secondary passband of the bandpass filter; and
      a lens disposed along an optical path including the bandpass filter and the image intensifier.

10. The corona detection device of claim 9, wherein the image intensifier is responsive to radiation having wavelengths of about 180 nm to about 800 nm.

11. The corona detection device of claim 9, wherein the image generated by the image intensifier is projected on a phosphor screen associated with the image intensifier.

12. The corona detection device of claim 11, further including an eyepiece configured for viewing the phosphor screen of the image intensifier.

13. The corona detection device of claim 11, further including a camera configured for recording images projected on the phosphor screen.

14. The corona detection device of claim 9, wherein the primary passband includes a peak transmittance of at least about 0.75.

15. The corona detection device of claim 9, wherein the secondary passband includes a peak transmittance of at least about 0.25.

16. A method of detecting corona emitted from an object, including:
   collecting radiation emitted or reflected by the object;
   passing the radiation through a bandpass filter having a primary passband that includes wavelengths in a range of about 250 nm to about 400 nm and a secondary passband that includes wavelengths in a range of about 675 nm to about 850 nm to provide filtered radiation;
   providing the filtered radiation to an image intensifier in optical communication with the bandpass filter;
   generating an image at the image intensifier based on the filtered radiation; and
   inspecting the image generated by the image intensifier.

17. The method of claim 16, further including passing the radiation or the filtered radiation through a lens in optical communication with the image intensifier.

18. The method of claim 17, further including focusing the lens on the object.

19. The method of claim 16, further including recording the image generated by the image intensifier.

* * * * *